May 27, 1958 G. F. OTTO 2,836,525
METHOD OF AND COMPOSITION FOR COATING ZIRCONIUM
Filed May 18, 1956
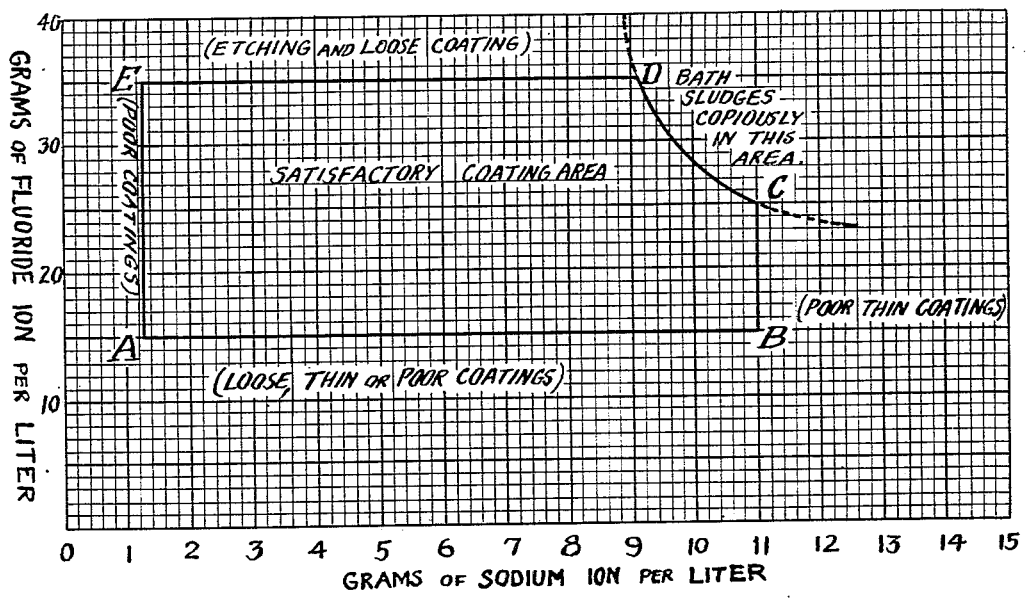
INVENTOR
George F. Otto
BY
Annestvedt & Lechner
ATTORNEYS United States Patent Office 2,836,525
Patented May 27, 1958

2,836,525

METHOD OF AND COMPOSITION FOR COATING ZIRCONIUM

George F. Otto, Oreland, Pa., assignor to American Chemical Paint Company, Ambler, Pa., a corporation of Delaware Application May 18, 1956, Serial No. 585,659

1 Claim. (Cl. 148—6.14)

This invention relates to the art of applying a chemically bonded coating to metal surfaces and is particularly concerned with the provision of a method and a composition for use in the coating of surfaces of zirconium or alloys thereof in which zirconium is the principal ingredient and the word "zirconium" as used herein is to be understood as including such alloys.

As is well known, zirconium is a metal with which it is difficult to work. It is not readily attacked by most acids and alkalies and has a tendency to gall rather severely when in frictional contact with other metal surfaces or when subject to mechanical cold-working operations.

The principal object of the present invention is to provide a novel method as well as a new composition for use in producing a coating on zirconium and, more particularly, for use in the production of a chemically bonded coating on such metal which will lessen the tendency to gall. Another object is the provision of a coating on zirconium which will serve as an excellent base for the reception of a siccative or other applied finish.

The invention is based upon the discovery that a useful chemically bonded crystalline coating may be produced on zirconium by subjecting the surface to the action of an aqueous acid solution containing sodium ion and fluoride ion as its essential and principal coating producing ingredients. To this end, I have found that the concentration of the sodium ion in the solution should lie between 1.25 grams and 11 grams per liter. At the same time, the concentration of the fluoride ion should lie between 15 and 35 grams per liter.

Additionally, there should be a definite relationship between the concentration of the sodium ion and the concentration of the fluoride ion in the solution which is used for the coating operation. This relationship is shown in the graph on the acompanying drawing in which the sodium ion content is plotted horizontally and the fluoride ion content vertically. Optimum concentrations and proportions lie within the boundaries of the curve shown on the graph. The effects of solutions which lie outside the region of optimum conditions are indicated by suitable legends. In fact, in order to realize the objects and advantages of the invention, the solutions employed must lie within the boundaries of the curve in order to yield satisfactory results.

Another factor which is important in the successful realization of the invention must also be considered and this is the acidity of the bath. It is desirable to express the acidity of operative solutions in terms of pH. Unfortunately, however, measuring the pH of these solutions is not without its attendant difficulties. An electrical pH meter using conventional glass electrodes, if properly employed, can be used for making the pH measurements, but it is inclined to be somewhat erratic because of the effect of the fluoride ion upon the glass. The glass electrode gives readings which are significant even though they are not always unequivocally interpretable because they sometimes exhibit a curious excursion with time from a low value to a value as much as a pH unit higher and then back to a value even lower than at first. Since a recheck in a standard buffer solution of the glass electrode, after measurement of one of my coating solutions, shows very little change, it may be assumed that the electrode is not permanently damaged when used for the measurement of my coating solutions. With these limitations in mind, the final, nearly steady meter reading of a pH by means of a commercial glass electrode pH meter in my improved solutions in correct operating condition falls in the range of approximately 3.5 to 4.8 inclusive.

If the pH is less than 3.5, the rate of coating formation is so rapid as to result in the deposition of loose and powdery coatings which have little or no value. On the other hand, if the pH is greater than 4.8, no coating whatsoever seems to be formed—at least no coating which is perceptible or visible. Between these two pH's tightly adherent chemically bonded crystalline coatings are formed on the surface of zirconium. Any adjustment of the pH which may be required to bring it within the limits specified may be effected by any of the ordinary means familiar to chemists, as by suitable additions of acid or alkali.

The form in which the ions are introduced into the bath appears to make little or no difference. For example, they may be introduced in the form of sodium fluoride, ammonium bifluoride, sodium chloride, sodium acetate, hydrofluoric acid, etc. At the same time, while the baths will tolerate considerable quantities of foreign anions, I have found it desirable to avoid the presence of large quantities of anions, such as arsenates, although my bath will tolerate large amounts of nitrates, chlorides, phosphates and acetates, provided the pH is kept within the stated limits.

As to the time of treatment, it has been found that this may vary although in most instances a period of up to approximately five minutes has generally produced the best results. Actually, however, useful coatings may be produced in considerably less time than five minutes as well as over longer periods and it might be said that just so long as treatment is continued to the point where a visible coating is produced the advantages of the invention in some measure will be realized.

Insofar as temperature is concerned, it is not necessary to heat the solution although some heat may be used if desired. In general, it has been found impractical to use solutions having a temperature in excess of 150° F., and for this reason, I prefer not to operate even as high as this.

Treatment of the surface can be by immersion, spraying or other technique whereby the solution is applied to the surface of the metal and kept in contact therewith for the required period of time, namely, until a visible coating is produced. After a visible coating has been obtained by means of immersion or spray procedures, the metal being treated should be removed from contact with the treating solution, rinsed and dried, and, if desired, the drying may be done with the application of heat.

Before attempting to carry out the process of the present invention, it is preferable that the surface should be reasonably clean. However, the cleaning step, per se, forms no part of the present invention and may be performed in any desired manner as by solvent cleaning, alkali cleaning or acid cleaning. After cleaning, the parts to be treated are subjected to the influence of the solution used with my invention in the manner already described.

As previously indicated, the coating produced in accordance with my invention is crystalline in nature and it acts as an excellent parting material on zirconium when used in frictional contact with other metals or with other pieces or surfaces of zirconium. Additionally, if so desired, the crystalline coatings of my invention may be lubricated with common lubricants familiar in this art so that the advantages of such lubricants may also be secured.

By way of exemplification only and not necessarily by way of limitation, I wish to list the following as typical examples of bath compositions which have been found to be especially useful in connection with my invention:

Example I

Ammonium bifluoride _____ grams__ 40  } pH=4.4
Sodium nitrate _____ do____ 20
Water _____ liter__ 1

(Use 5 minutes at 80° F.)

Example II

Sodium fluoride _____ grams__ 20  } pH=3.8
50% HF solution _____ ml____ 35
Water _____ ml____ 965

(Use 5 minutes at 80° F.)

Example III

Ammonium bifluoride _____ grams__ 22  } pH=4.3
Sodium chloride _____ do____ 8
Water _____ liter__ 1

(Use 3 to 5 minutes at 80° F.)

I claim:

The method of coating zirconium which comprises treating the surface with an aqueous acid solution consisting essentially of sodium ion and fluoride ion as its coating-producing ingredients, the quantities of said ions per liter being as follows:

|          | Grams      |
|----------|------------|
| Sodium   | 1.25 to 11 |
| Fluoride | 15 to 35   | and the relative amounts of the said ions lying within the region bounded by the lines AB, BC, CD, DE and AE on the accompanying graph, the pH of the solution being from about 3.5 to 4.8 after a nearly steady reading as measured by an electrical pH meter using conventional glass electrodes, the temperature of the bath being less than 150° F. and the treatment being continued until a visible coating has been obtained.

References Cited in the file of this patent

UNITED STATES PATENTS

| 1,957,354 | Prier          | May 1, 1934  |
| 2,489,152 | Panepinto      | Nov. 22, 1949 |
| 2,550,660 | Amundsen et al.| May 1, 1951  |

FOREIGN PATENTS

| 133,431 | Australia | July 4, 1949 |